United States Patent [19]

Blum et al.

[11] Patent Number: 4,543,393

[45] Date of Patent: Sep. 24, 1985

[54] MIXTURES, FOR POLYURETHANE ADHESIVES, WHICH CONSIST OF POLYOLS AND/OR POLYAMINES AND POLYISOCYANATES, ARE LIQUID AT ROOM TEMPERATURE, HAVE A LONG SHELF LIFE AND CAN BE ACTIVATED BY HEAT

[75] Inventors: Rainer Blum, Ludwigshafen; Hellmut Buensch, Leimen; Wolfgang Druschke, Dirmstein; Helmut Mueller, Kaiserslautern, all of Fed. Rep. of Germany

[73] Assignee: BASF Aktiengesellschaft, Fed. Rep. of Germany

[21] Appl. No.: 631,506

[22] Filed: Jul. 16, 1984

[30] Foreign Application Priority Data

Jul. 16, 1983 [DE] Fed. Rep. of Germany ....... 3325735

[51] Int. Cl.$^4$ .............................................. C08G 18/80
[52] U.S. Cl. ...................................... 525/124; 528/45; 528/49; 528/73; 528/75; 528/85; 528/902
[58] Field of Search ...................... 528/45, 49, 73, 75, 528/85, 902; 525/124

[56] References Cited

U.S. PATENT DOCUMENTS

| | | | |
|---|---|---|---|
| 3,475,200 | 10/1969 | Kallert | 117/94 |
| 3,681,277 | 8/1972 | Scholz et al. | 260/24 |
| 3,935,144 | 1/1976 | Hagenweiler et al. | 260/24 |
| 4,087,392 | 5/1978 | Hartmann et al. | 260/24 |
| 4,251,427 | 2/1981 | Recker et al. | 260/37 N |
| 4,400,497 | 8/1983 | Blum et al. | 528/45 |

FOREIGN PATENT DOCUMENTS 2002457 7/1971 Fed. Rep. of Germany .
1469682 4/1977 United Kingdom .

Primary Examiner—Maurice J. Welsh
Attorney, Agent, or Firm—Keil & Weinkauf

[57] ABSTRACT

Mixtures which are liquid at room temperature, have a long shelf life and can be activated by heat and which comprise (A) polyols and/or polyamines, component (A) having a viscosity of less than 100 Pa.s at room temperature, the OH number being less than 112 and the mean functionality of the starting materials being from 1.1 to 6, and (B) polyisocyanates which are dispersed in (A), are stabilized to (A) as a result of a phase-separating deactivation at the surface of the dispersed particles, and are present in an amount such that there are from 0.1 to 2 equivalents of the total isocyanate present in the polyisocyanate per equivalent of hydroxyl or amino groups of component (A), are particularly useful for contact adhesives.

7 Claims, No Drawings

MIXTURES, FOR POLYURETHANE ADHESIVES, WHICH CONSIST OF POLYOLS AND/OR POLYAMINES AND POLYISOCYANATES, ARE LIQUID AT ROOM TEMPERATURE, HAVE A LONG SHELF LIFE AND CAN BE ACTIVATED BY HEAT

The present invention relates to self-crosslinking pressure-sensitive adhesive compositions which are liquid at room temperature and consist of polyisocyanates and substances which are reactive toward isocyanates, the isocyanates being deactivated at the surface and the inner phase forming a dispersion.

Pressure-sensitive adhesives are being used to an increasing extent for the production of self-adhesive articles, such as labels, self-adhesive tapes and decorative or protective films.

The contact adhesive compositions used for this purpose must possess certain properties. In addition to good surface tackiness, the coating should have very high cohesion and good adhesion to the substrates, e.g. metal, glass, paper, cardboard and plastics, such as polyethylene, polypropylene, polyesters and polyvinyl chloride. Important criteria for pressure-sensitive adhesives are high stability to light, air and moisture, as well as good surface tackiness even at low temperatures down to about 0° C. and satisfactory cohesion of the coating even at elevated temperatures as high as about 50° C.

To date, pressure-sensitive adhesives are available as aqueous dispersions, solutions, non-aqueous dispersions, hot-melt adhesives or contact adhesive compositions which are crosslinked by high-energy radiation. Dispersions and solutions have the disadvantage that large amounts of solvents or dispersants are required, and these have to be evaporated after application.

Use of organic solvents necessitates expensive solvent-recovery plants. Hot-melt adhesives have to be melted and applied at relatively high temperatures and, like the radiation-curing systems, require relatively complicated and expensive apparatuses.

It is known in principle that polyurethanes can be used as pressure-sensitive adhesive materials, this having been disclosed in, for example, German Laid-Open Application DOS No. 2,002,457, U.S. Pat. Nos. 3,681,277 and 3,935,144 and British Pat. No. 1,469,682, where polyols and thermoplastic tackifiers are reacted with polyisocyanates as crosslinking agents. The disadvantage is that the ready-prepared mixtures have a short shelf life, which is as a rule only a few hours. Other disadvantages are the necessity of separate preparation and storage, difficulties in connection with accurate metering and thorough mixing before application, and the danger of blockage of the mixing and application apparatuses as a result of premature reaction.

Another conventional method for the preparation of polyisocyanate compositions having a long shelf life starts from non-crosslinked prepolymers which contain only a small amount of free isocyanate, atmospheric moisture serving as the crosslinking agent.

The disadvantage in this case is that curing, starting at the surface, penetrates only slowly into the depths of the coating, and the final properties are achieved only after prolonged storage. The possibility of using isocyanates as self-crosslinking pressure-sensitive adhesives and other prepolymers as externally crosslinkable pressure-sensitive adhesives has the great disadvantage that these substances have relatively high viscosities which make it necessary to use them in the form of solutions or dispersions (cf. for example U.S. Pat. No. 3,437,622), with the result that an expensive procedure for evaporating off the solvent or dispersant is necessary.

Stable systems can also be formulated if the polyisocyanates are first reacted with a monofunctional reactant. The resulting adducts are referred to as blocked isocyanates if they possess less thermal stability than the products of the crosslinking reaction subsequently to be carried out. Under the action of heat, the blocking agent is eliminated and the polyisocyanate undergoes crosslinking with formation of bonds which are thermally more stable.

As described in, for example, U.S. Pat. No. 4,087,392, this principle is used for pressure-sensitive adhesives. However, these adhesives do not have a satisfactory shelf life, nor do they give stable films, since the adhesion decreases substantially after only a few days.

There is therefore a need for essentially solvent-free liquid isocyanate systems which have a long shelf life at room temperature and a low viscosity and can be activated by heat.

U.S. Pat. Nos. 3,475,200 and 4,251,427 describe polyisocyanates which melt at above 100° C. or above 130° C. and which, together with special polyols, give combinations which have a long shelf life and which can be cured by heating to give coatings for fabrics or woven hose. However, in order to achieve a long shelf life, this process has to be carried out using a polyol selected from a very narrow range of special polyols, and the products are therefore completely unsuitable for a number of applications.

Finally, U.S. Pat. No. 4,400,497 discloses fluid or pasty heat-curable single-component polyurethane systems which have a shelf life of more than 3 months and are intended for hard, abrasion-resistant coatings, especially for automotive undersealing. In these systems, the polyisocyanates are dispersed in the polyol, in the form of discrete particles which are deactivated at their surface. From 0.5 to 20 equivalent percent of the total number of polyisocyanate groups present should be deactivated, deactivation being effected by means of, for example, water or amines. Even if these single-component polyurethane systems are suitable for bonding, they cannot be used as pressure-sensitive adhesives because they cure to give hard, nontacky polyurethanes.

The present invention relates to mixtures which are liquid at room temperature, have a long shelf life and can be activated by heat, and which comprise (A) polyols and/or polyamines, component (A) having a viscosity of less than 100 Pa.s at room temperature, the OH number being less than 112 and the mean functionality of the starting materials being from 1.1 to 6, and (B) polyisocyanates which are dispersed in (A), are stabilized to (A) as a result of a phase-separating deactivation at the surface of the dispersed particles, and are present in an amount such that there are from 0.1 to 2 equivalents of the total isocyanate present in the polyisocyanate per equivalent of hydroxyl or amino groups of component (A).

The mixtures can additionally contain polyols and/or polyamines having equivalent weights of from 800 to 20,000, hydroxyl-containing and/or amino-containing vinyl, acrylate or diene polymers, resins which are reactive or unreactive toward isocyanates, and compounds which accelerate the heat-activation process.

The novel mixtures contain the polyisocyanate in the form of discrete particles which have diameters of from 0.01 to 250 μm and are dispersed in component A, with the proviso that these particles are deactivated at their surface, thereby keeping the system stable. The deactivation in general consumes only a relatively small proportion of the total number of isocyanate groups present, i.e. 0.01–20 equivalent percent, and crosslinking of the system is essentially effected by means of the free isocyanate groups which are then still present.

During heat activation, dissolving or melting processes eliminate the phase separation, so that crosslinking can take place. To modify the properties which are important for processing and during use, it may be advantageous to add protective colloids, catalysts, minor amounts of inert and reactive solvents and/or diluents, viscosity regulators, thixotropic agents, and additives which control the reaction and the composition of the polyurethanes formed in the reaction and which are conventionally used in polyurethane chemistry, e.g. chain terminators, chain lengtheners, crosslinking agents, plasticizers, fillers, pigments, soluble dyes, tackifiers, light stabilizers, antioxidants and/or scents.

In the preparation of the mixtures, the polyisocyanate is preferably dispersed at below 60° C., and either the deactivating agent is added to the liquid phase or some or all of the deactivating agent is added subsequently to the dispersion of the polyisocyanate in the polyol.

In the preparation of the novel mixtures, it is advantageous to carry out the deactivation of the polyisocyanate particles in a separate process step before the dispersing procedure, and to disperse the resulting stabilized polyisocyanates in the remaining components. The above additives can be added to the batches completely or in portions, either before or after the dispersing procedure. The sequence in which the components of the pressure-sensitive adhesive are combined is not critical and is generally governed by factors relating to the manufacturing process.

Component (A) of the novel mixtures generally consists of polyols and/or polyamines which are liquid at room temperature and have a viscosity of less than 100 Pa.s at room temperature, an OH number of less than 112 and a mean functionality of from 1.1 to 6. For example, they can be selected from the group consisting of polyethers, polyesters, polyurethanes, nylons, polyetherurethanes, polyether-esters and polyesterurethanes. Polyols containing ether, ester and/or urethane groups, in particular diols and triols having equivalent weights greater than 1,000, are preferably used. In another preferred embodiment, diols and/or triols having equivalent weights greater than 1,000 are predominantly used, i.e. in an amount of more than about 80, particularly preferably more than 90%, by weight, together with not more than about 20, preferably less than 10%, by weight of low molecular weight diols and/or polyols.

Polyols or polyol mixtures having OH numbers higher than 112 give mixtures which do not possess sufficient tack to permit them to be used as pressure-sensitive adhesives in practice. The amount of low molecular weight diols or polyols also depends on their equivalent weight. If polyols having very low equivalent weights are used, e.g. ethylene glycol, propylene glycol, butanediol, glycerol, trimethylolpropane, neopentylglycol or pentaerythritol, or even water, it is only possible to produce a pressure-sensitive adhesive using small amounts corresponding to the equivalent weights, since otherwise the products obtained after heat-activation are too hard and the surface tackiness is insufficient. It is also possible concomitantly to use a certain amount, i.e. not more than about 30 equivalent percent, of monofunctional compounds, but as a rule this is not necessary. It is preferable to use polyols or polyol mixtures having a mean functionality of from 1.5 to 4, in particular from 1.5 to 3.

Component (A) preferably has a viscosity of only up to 20 Pa.s. With viscosities above 100 Pa.s, it is difficult to obtain a uniform coating. It is also possible for polyols which themselves are solid at room temperature to be present if component (A) overall is liquid at room temperature.

Component (B) is prepared from polyisocyanates, for example from the conventional aliphatic, cycloaliphatic and aromatic diisocyanates and polyisocyanates, as obtained by an addition reaction of a diisocyanate with a diol, triol or polyol, or from diisocyanates by dimerization to give uretdiones or trimerization to give isocyanurates or reaction with amines or water to give biurets. Particularly suitable diisocyanates are diphenylmethane diisocyanate, toluylene diisocyanate, isophorone diisocyanate and hexamethylene diisocyanate.

Preferred polyisocyanates are those which are solid at room temperature, for example the adduct obtained from toluylene diisocyanate and trimethylolpropane, or the cyanurate obtained from 3 moles of toluylene diisocyanate and in particular sparingly soluble pulverulent dimerized toluylene diisocyanate, isophorone diisocyanate and diphenylmethane diisocyanate having uretdione groups. The novel mixtures contain polyisocyanates dispersed, in the polyol, in the form of discrete particles having diameters of from 0.01 to 250, preferably from 1 to 50, μm, isocyanate groups and hydroxyl groups being present in general in ratios of from 0.5:1 to 1:0.5, preferably from 0.8:1 to 1:0.8.

The dispersed polyisocyanate particles are deactivated at their surface so that the polyisocyanate particles do not react with the polyol at room temperature.

The deactivating agent is chosen so that it is bonded to the surface of the polyisocyanate particles by chemical or physical forces, effecting phase separation between polyisocyanate particles and polyol.

For the chemical deactivation, from 0.01 to 20, preferably from 0.01 to 1, equivalent percent of the total number of isocyanate groups present is reacted with the deactivating agent.

Examples of suitable deactivating agents are water, monoamines, polyamines, monoalcohols and polyalcohols. Particularly suitable compounds are relatively long-chain monoamines, e.g. stearylamine, which lead to emulsifying properties. Relatively high molecular weight polyamines, e.g. polyamideamines and polymers possessing terminal hydroxyl groups, such as hydroxyl-terminated polybutadiene oils, react to form grafted protective colloids. Other reactions which are particularly suitable for deactivating the isocyanate groups at the surface of the polyisocyanate particles, i.e. for stabilizing the isocyanate/polyol dispersions, are those which lead to urea or polyurea structures on the isocyanates, since these structures are insoluble in most polyols and organic solvents. Reagents which form such ureas or polyureas are water and primary or secondary amines. An advantage of this process is that the urea structures react further with other isocyanates at elevated temperatures to form biuret structures, i.e. the deactivating agent is incorporated into the crosslinked system and no inhomogeneity remains.

Other suitable compounds are those which contain carboxyl, mercaptan, amide, hydrazide or phenolic hydroxyl groups. A preferred procedure starts from pulverulent dimerized toluylene diisocyanate. Because isocyanate reacts substantially more rapidly with primary amines than with polyols, it is possible directly to obtain a mixture having a long shelf life by stirring pulverulent dimerized toluylene diisocyanate into, for example, polyamidoamine-containing polyetherol.

In a preferred embodiment, hydroxyl-containing and/or amino-containing acrylate, vinyl ester and/or diene copolymers are concomitantly used as constituents of component (A). As a rule, they are prepared using monomers which are inert to isocyanate and those which contain primary and/or secondary amino groups and/or hydroxyl groups, or in which these groups are made available by subsequent reaction, for example by hydrolysis of vinyl esters or N-vinylcarboxamides.

Examples of suitable starting monomers are acrylates and methacrylates where the alcohol radical is of 1 to 20 carbon atoms, such as methyl, ethyl, butyl, 2-ethylhexyl, decyl or lauryl acrylate or methacrylate, vinyl esters of carboxylic acids of 1 to 20 carbon atoms, such as vinyl formate, acetate, propionate or laurate, vinylaromatics of 8 to 12 carbon atoms, such as styrene and substituted styrenes, olefins of 2 to 20 carbon atoms, vinyl esters, allyl ethers, allyl esters and vinyl halides.

The diene polymers are derived in particular from butadiene, as well as from isoprene and in addition vinylaromatics and/or acrylonitrile or methacrylonitrile. Particularly suitable comonomers possessing functional groups are hydroxyalkyl acrylates and methacrylates, such as hydroxyethyl, hydroxypropyl or hydroxybutyl acrylate or methacrylate, vinyl esters of hydroxycarboxylic acids, vinyl ethers and alkyl ethers of polyhydric alcohols, as well as amino-containing monomers, such as acrylamide and methacrylamide.

However, polymers which do not contain any groups which are reactive toward isocyanate can also be suitably modified by subsequent reaction. For example, copolymers which contain vinyl esters can be converted by (partial) hydrolysis to suitable polymers possessing OH functional groups. Particularly preferably, such copolymers are prepared in solution, polyols and/or polyamines which can be used as constituents of component (A) also serving as solvents. The amount of such polymers can be as high as 30 equivalent percent, based on (A).

Resins which are inert to isocyanate and have softening points as high as 200° C. may be used concomitantly as tackifiers in amounts as high as 60% by weight, based on (A), and these resins may furthermore be liquid at room temperature. Resins, such as phenol, melamine or urea/formaldehyde prepolymers, which react with isocyanates can also be used for the novel mixtures. The amount of these resins is chosen as a rule to be less than 30 equivalent percent, based on (A), with the proviso that the total amount of additives which are reactive toward isocyanate is not more than 60 equivalent percent, based on (A).

Preferred mixtures according to the invention additionally contain compounds which accelerate the heat activation, these compounds being present in an amount of from 0.01 to 5, in particular from 0.1 to 2, % by weight, based on (B). Examples of suitable activators are polyurethane catalysts of the conventional type, e.g. tertiary amines, such as triethylamine, tributylamine, N-methylmorpholine, N-ethylmorpholine, N,N,N',N'-tetramethylethylenediamine, pentamethyldiethylenetriamine and higher homologs (U.S. Pat. No. 2,624,572 and British Pat. Nos. 1,530,225 and 1,530,226), 1,4-diazabibyclo[2,2,2]octane, N-methyl-N'-dimethylaminoethylpiperazine, bis(dimethylaminoalcohol)-piperazines (German Laid-Open Application DOS No. 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines (U.S. Pat. No. 3,814,707), bis(dialkylamino)alkyl ethers (cf. for example U.S. Pat. Nos. 3,330,782, 2,941,967 and 3,694,570) and tertiary amines possessing amide groups (preferably formamide groups), as described in U.S. Pat. Nos. 4,348,536 and 4,248,930). Other suitable catalysts are Mannich bases obtained from secondary amines, such as dimethylamine, and aldehydes, preferably formaldehyde, or ketones, such as acetone, methyl ethyl ketone or cyclohexanone, and phenols, such as phenol, nonylphenol or bisphenol.

Examples of tertiary amines which are suitable catalysts and possess hydrogen atoms which are active toward isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

The mixtures according to the invention are prepared in general using conventional dispersing and mixing units. The polyisocyanate is dispersed in the polyol in general at below 40° C., preferably from 0° to 25° C., and, for example, the polyol itself can contain the entire amount of deactivating agent, or the latter can be added to the mixture shortly after the dispersing process.

The novel mixtures generally have a shelf life of more than 3 months at 25° C., without any loss of reactivity or an irreversible change being observed.

The novel pressure-sensitive adhesives can readily be applied onto the conventional substrates using the conventional machines usually employed for contact adhesive solutions or dispersions, application being effected by, for example, painting, spraying, knife-coating, casting or roller-coating. A particular advantage of the novel pressure-sensitive adhesives is that no diluents have to be evaporated, so that only a small amount of energy is consumed and no further environmental or work safety measures are required.

Activation of the novel pressure-sensitive adhesives is carried out at from 70° to 180° C., preferably from 90° to 140° C., and requires only from a few seconds to a few minutes.

To assess the adhesive properties of sheet-like substrates coated with the pressure-sensitive adhesives according to the invention, the shear strength is used as a measure of the cohesion, and the rolling ball test as a measure of the surface tackiness. To carry out the measurements, polyethylene terephthalate films are coated with 25 g/m² of the pressure-sensitive adhesives. After activation at 120° C., the film is cut into 2 cm wide strips and these are applied to a chrome-plated brass sheet, which is then stored for 24 hours in a conditioned chamber at 23° C. and 65% relative humidity.

To determine the cohesion, bonds are produced over a length of 2.5 cm and, after storage, are suspended under load from a 1 kg weight. The measure employed is the time taken for the bond to break under the force of the weight.

The tack is determined using the tack rolling ball method according to PSTC 6.

In the Examples which follow, parts and percentages are by weight, unless stated otherwise. The OH numbers stated therein were determined in accordance with DIN 53 240, the molecular weights were determined by vapor pressure osmosis in tetrahydrofuran, and the viscosities were measured using an Epprecht viscometer.

EXAMPLE 1

133 parts of a polyether triol based on glycerol and propylene oxide and having a molecular weight of 4,000, 215 parts of a polyethertriol based on glycerol, propylene oxide and ethylene oxide, having a molecular weight of 6,500 and containing about 85% of primary OH groups, and 36.5 parts of a polyetherdiol based on water and propylene oxide and having a molecular weight of 1,000 are mixed by stirring. 0.4 part of dibutyltin dilaurate and 0.75 part of diazabicyclooctane are then stirred in, after which 21 parts of dimerized toluylene diisocyanate (obtained via uretdione formation) are added, dispersing is carried out with vigorous stirring, and finally 0.42 part of a polyamidoamine based on dimeric linoleic acid and triamines, having an amine number of about 300 and a viscosity of 52 Pa.s at 25° C., is added. The resulting mixture can advantageously be used as a pressure-sensitive adhesive.

EXAMPLE 2

30 parts of a polyethertriol based on glycerol and propylene oxide and having a molecular weight of about 420, 161 parts of a polyethertriol based on glycerol, propylene oxide and ethylene oxide and having a molecular weight of about 4,800, 0.2 part of dibutyltin dilaurate, 0.25 part of tributylamine, 17.5 parts of dimerized toluylene diisocyanate and 0.35 part of the polyamidoamine stated in Example 1 are mixed in the manner described in Example 1. The resulting mixture can be used as a pressure-sensitive adhesive.

EXAMPLE 3

The procedure described in Example 1 is followed, except that, instead of the dimerized toluylene diisocyanate, 37 parts of dimerized diphenylmethane diisocyanate (via uretdione formation) are employed. The resulting mixture is a useful pressure-sensitive adhesive.

EXAMPLE 4

1 part of a solution of 50 parts of a phenolcolophony resin having a softening point of 85° C. in 50 parts of a polypropylene glycol alkylphenyl ether having a number average molecular weight of 360 is added, while stirring, to 7 parts of the mixture described in Example 3, immediately after preparation.

EXAMPLE 5

1 part of a hydrocarbon resin which is liquid at room temperature and has a molecular weight of 980 is added, while stirring, to 3 parts of the mixture described in Example 3.

TESTING THE PRESSURE-SENSITIVE ADHESIVES OF EXAMPLES 1 TO 5

24 hours after their preparation, the contact adhesives are applied in an amount of 25 g/m$^2$ onto polyethylene terephthalate films by means of a knife-coater, and the coated films are stored for 5 minutes at 120° C.

To determine the shelf life, the pressure-sensitive adhesives are tested after storage for 3 months at 30° C. The results are shown in the Table below.

TABLE 1

| Example | after 24 hours shear strength in hours | tack | after 3 months. shear strength in hours | 30° C. tack |
| --- | --- | --- | --- | --- |
| 1 | 120 | 4–5 | 120 | 5 |
| 2 | 120 | 6 | 120 | 8 |
| 3 | 120 | 10 | 120 | 9 |
| 4 | 120 | 10 | 120 | 12 |
| 5 | 120 | 4 | 120 | 4 |

Shear strengths of 80–100 hours are regarded as good, and longer shear strengths as very good. A value of about 10–14 in the rolling ball test indicates good tack, while values below 10 indicate very good tack.

We claim:
1. A mixture which is liquid at room temperature, has a long shelf life and can be activated by heat and which comprises
   (A) polyols and/or polyamines, component (A) having a viscosity of less than 100 Pa.s at room temperature, the OH number being less than 112 and the mean functionality of the starting materials being from 1.1 to 6, and
   (B) polyisocyanates which are dispersed in (A), are stabilized to (A) as a result of a phase-separating deactivation at the surface of the dispersed particles, and are present in an amount such that there are from 0.1 to 2 equivalents of the total isocyanate present in the polyisocyanate per equivalent of hydroxyl or amino groups of component (A).
2. A mixture as defined in claim 1, wherein more than 50 equivalent percent, based on (A), of polyols and/or polyamines having OH numbers of from 2.8 to 70 are used.
3. A mixture as defined in claim 1, which additionally contains as much as 30 equivalent percent, based on (A), of hydroxyl-containing and/or amino-containing vinyl and/or diene polymers.
4. A mixture as defined in claim 1, which additionally contains as much as 60% by weight, based on (A), of resins which are inert to isocyanate and have softening points as high as 200° C.
5. A mixture as defined in claim 1, which additionally contains as much as 50 equivalent percent of resins which are capable of reacting with isocyanate and have softening points as high as 200° C., with the proviso that the sum of the compounds which are reactive toward isocyanate, apart from (A), is not more than 60 equivalent percent, based on (A).
6. A mixture as defined in claim 1, which contains from 0.01 to 5% by weight, based on (B), of a compound which accelerates the activation.
7. A mixture as defined in claim 1, wherein polyether-polyols, polyester-polyols and/or polyurethanepolyols are used as component (A).

* * * * *